United States Patent
Dobre et al.

(10) Patent No.: US 9,707,819 B2
(45) Date of Patent: *Jul. 18, 2017

(54) DEVICE FOR ADJUSTING THE HEIGHT OF A VEHICLE BODY

(71) Applicant: Schaeffler Technologies AG & Co. KG, Herzogenaurach (DE)

(72) Inventors: Florin Dobre, Brasov (RO); Adrian Husu, Brasov (RO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/912,279

(22) PCT Filed: Aug. 5, 2014

(86) PCT No.: PCT/DE2014/200378
§ 371 (c)(1),
(2) Date: Feb. 16, 2016

(87) PCT Pub. No.: WO2015/021979
PCT Pub. Date: Feb. 19, 2015

(65) Prior Publication Data
US 2016/0193890 A1    Jul. 7, 2016

(30) Foreign Application Priority Data

Aug. 14, 2013  (DE) .................. 10 2013 013 467
Aug. 27, 2013  (DE) .................. 10 2013 216 969

(51) Int. Cl.
| | | |
|---|---|---|
| *B60G 17/02* | (2006.01) | |
| *B60G 15/06* | (2006.01) | |
| *F16F 9/56* | (2006.01) | |
| *F16H 25/20* | (2006.01) | |
| *F16H 25/22* | (2006.01) | |

(52) U.S. Cl.
CPC ......... *B60G 17/021* (2013.01); *B60G 15/062* (2013.01); *F16F 9/56* (2013.01);
(Continued)

(58) Field of Classification Search
CPC .. F16H 25/20; F16H 25/2015; F16H 25/2021; F16H 25/2204; F16H 25/2247;
(Continued)

(56) References Cited

U.S. PATENT DOCUMENTS 7,722,056 B2 *  5/2010  Inoue .................. B60G 15/063
                                                                280/5.512
7,784,373 B2 *  8/2010  Minbuta ............. F16H 25/2021
                                                                74/424.94

(Continued)

FOREIGN PATENT DOCUMENTS

DE    102010036238    3/2012
EP         1953013    8/2008
(Continued)

*Primary Examiner* — Laura Freedman
(74) *Attorney, Agent, or Firm* — Volpe and Koenig, P.C.

(57) ABSTRACT

A device (1) for adjusting the height of a vehicle body, including two components (3, 4) that can be moved longitudinally between adjustment positions in relation to each other, a ball screw (5), which sets the adjustment positions and which has a spindle (9) and a spindle nut (8), wherein the spindle (9) is connected to the one component (3) in an axially fixed manner and the spindle nut (8) is connected to the other component (4) in an axially fixed manner. A switchable axial stop (17) is operatively arranged between the two components (3, 4) and mechanically bypasses the ball screw (5) in at least one of the adjustment positions.

10 Claims, 4 Drawing Sheets

(52) U.S. Cl.
CPC .... *B60G 2202/312* (2013.01); *B60G 2202/42* (2013.01); *B60G 2202/442* (2013.01); *B60G 2204/1242* (2013.01); *B60G 2204/418* (2013.01); *B60G 2204/419* (2013.01); *B60G 2204/45* (2013.01); *B60G 2204/62* (2013.01); *B60G 2206/41* (2013.01); *B60G 2500/30* (2013.01)

(58) Field of Classification Search
CPC ............. F16H 25/2252; F16H 25/2285; F16H 2025/228; B60G 17/021; B60G 15/062; B60G 2202/312; B60G 2202/42; B60G 2202/442; B60G 2204/1242; B60G 2204/418; B60G 2204/419; B60G 2204/45; B60G 2204/4604; B60G 2204/62; B60G 2206/41; B60G 2500/30; B60G 17/00; B60G 17/0157; B60G 2204/44; F16F 9/56
See application file for complete search history.

(56) References Cited

U.S. PATENT DOCUMENTS

| | | | |
|---|---|---|---|
| 7,887,064 B2 * | 2/2011 | Inoue | B60G 11/27 280/5.5 |
| 8,103,408 B2 * | 1/2012 | Inoue | B60G 17/06 280/5.5 |
| 8,398,091 B2 * | 3/2013 | Inoue | B60G 17/0157 188/266.1 |
| 8,454,029 B2 * | 6/2013 | Michel | B60G 15/065 280/124.157 |
| 8,516,914 B2 * | 8/2013 | Osterlanger | B60G 7/006 188/129 |
| 8,943,916 B2 * | 2/2015 | Osterlaenger | B60G 7/006 192/223.4 |
| 2002/0089107 A1 * | 7/2002 | Koh | B60G 13/001 267/218 |
| 2007/0210539 A1 * | 9/2007 | Hakui | B60G 15/063 280/5.514 |
| 2008/0111334 A1 * | 5/2008 | Inoue | B60G 17/021 280/124.1 |
| 2008/0164111 A1 * | 7/2008 | Inoue | B60G 15/065 188/297 |
| 2009/0108546 A1 | 4/2009 | Ohletz et al. | |
| 2010/0308518 A1 | 12/2010 | Michel | |

FOREIGN PATENT DOCUMENTS

| | | |
|---|---|---|
| EP | 2332756 | 6/2011 |
| JP | 2011012785 A * | 1/2011 |
| JP | 2011196507 A * | 10/2011 |
| WO | 2013031623 | 3/2013 |

* cited by examiner

DEVICE FOR ADJUSTING THE HEIGHT OF A VEHICLE BODY

BACKGROUND

The invention relates to a device for adjusting the height of a vehicle body with two components that can be displaced longitudinally relative to each other between adjustment positions and with a ball screw that sets the adjustment positions and has a spindle and a spindle nut, wherein the spindle is connected to one component in an axially fixed manner and the spindle nut is connected to the other component in an axially fixed manner.

Devices according to the class for adjusting the height of a vehicle body are provided in the suspension struts of motor vehicles, in particular, for increasing the ground clearance of motor vehicles or lowering the body for flat road surfaces. Here, for example, according to EP 2 332 756 A2, a height adjustment can be provided between a suspension strut mount and an upper spring plate of a biased spring of the suspension strut or, as known from EP 1 953 013 A2, between a part holding a wheel carrier, such as a sleeve part, and a lower spring plate. An actuation of such devices takes place, for example, by means of an electric motor that rotationally drives a torque converting device, for example, a spindle drive or ball spindle drive, so that from the rotational movement, for example, a rotationally locked and axially displaceable spindle and an axially fixed spindle nut rotationally driven by this movement performs an axial displacement of a fixed component relative to a component of the suspension strut that is axially displaceable relative to this part and thus an essentially continuous height adjustment of the suspension strut and thus of the vehicle body is achieved with a corresponding setting of the ground clearance between an upper and a lower adjustment position. Here, shocks applied to the wheel mounted on the suspension strut have a negative effect on the movement thread, in particular, on the balls and their raceways of a ball screw.

The object of the invention is the advantageous refinement of a device for adjusting the height of a vehicle body, whose ball screw is not subjected at least partially to shocks.

SUMMARY

The objective is achieved by one or more features of the invention.

The device provided is used for adjusting the height of a vehicle body. For this purpose, two components that are longitudinally displaceable relative to each other between adjustment positions are provided that are spaced apart by a ball screw setting the adjustment positions. In the broad sense, a ball screw is understood to be a movement thread in which, by turning a first, axially fixed thread component and a rotationally fixed, axially displaceable arrangement of a second thread component, a longitudinal displacement of the components is achieved. The ball screw here has a spindle and a spindle nut that can rotate on this spindle. Here, depending on the design of the ball screw, the spindle or the spindle nut is driven by a rotary drive, for example, an electric motor. The spindle is here connected to one component in an axially fixed manner and the spindle nut is connected to the other component in an axially fixed manner, so that, for a rotational drive of the spindle or the spindle nut and a rotationally fixed arrangement of the other component of the ball screw, an axial displacement, such as longitudinal displacement of the components relative to each other and thus the height adjustment of the vehicle body is achieved.

Under an axially fixed arrangement of the spindle nut or the spindle relative to the corresponding components, an axially fixed arrangement is to be understood. Alternatively, only one axial one-side axial support can be provided, wherein the other axial direction is loaded by means of a supporting force. This supporting force can be provided by an energy storage device, for example, a spring, the gravitational force of the vehicle body, or the like.

In order to protect the ball screw, in particular, its rolling bodies, from high loads, at least one switchable axial stop is provided that is operatively arranged between the two components and mechanically bypasses the ball screw in at least one of the adjustment positions of the components relative to each other, for example, at an adjustment position for a maximum, minimum, and/or average longitudinal displacement of the components.

In other words, the device provided for adjusting the height of a vehicle body contains a ball screw in which an axially fixed component that can rotate, for example, a spindle nut, is held, for example, by means of a single-row or multi-row rolling bearing on a second of two components, for example, a sleeve part of a suspension strut. The spindle nut is held on an axially displaceable spindle that is held rotationally locked in the second component and is connected to the first component of the suspension strut or forms this suspension strut. Between the spindle and the spindle nut, balls roll on raceways provided in these parts, wherein these balls are returned by means of a ball circulation channel. In this respect, the ball screw is integrated on a suspension strut arranged between the vehicle body and a wheel carrier. For adjusting the height by an axial displacement of the two components relative to each other, the sleeve is rotationally driven by an electric motor. The motor is preferably arranged with its rotor axis parallel with respect to an axis of the axial displacement of the two components, that is, parallel to the spindle axis of the spindle, and drives the spindle nut by means of an endless tension element, for example, a chain, but preferably by means of a belt or a gearwheel connection. The height adjustment is performed between a lower adjustment position and an upper adjustment position of the spindle or the first component relative to the second component. In order to protect the ball screw, in particular, from damage and wear, a switchable axial stop is provided between the components at least at the upper adjustment position.

For forming the at least one switchable stop, a switching device can be provided with a cam ring that is supported so that it can rotate about the spindle axis of the spindle and is supported on the spindle in an axially fixed manner, wherein the second component supported on the spindle nut in an axially fixed manner is provided with longitudinal grooves and recesses arranged along the spindle axis and arranged distributed around the circumference around the spindle axis, wherein cams of the cam ring distributed around the circumference around the spindle axis engage in the longitudinal grooves in a first rotational position of the cam ring relative to the second component, wherein the cams engage in the recesses in another rotational position of the cam ring in at least one of the adjustment positions and form a first axial stop.

In addition, the switching device of the device provided can have a control ring that is connected rigidly to the second component and is arranged around the spindle axis and is provided with ramps arranged distributed around the circumference, wherein the cam ring rotates under its axial displacement relative to the control ring so far around the spindle axis that its cams are displaced along the ramps, wherein the cam ring is rotated from its first rotational position in the direction of the other rotational position by means of this rotation about the spindle axis.

In addition, the cam ring can be displaced under actuation of the ball screw axially relative to the second component, wherein the cam ring is displaced during the engagement of its cams in the longitudinal grooves of the second component axially relative to the second component without relative rotation and the cam ring is rotated with its cams outside of this engagement for contact on the ramps of the control ring.

In other words, the switchable stop can be provided between the spindle and the second component in a switchable manner as a function of a direction of rotation of the electric motor. This means that the switchable stop is switched by the provision of corresponding control means through a change of the direction of rotation. In this way, through a single or multiple reversal of the direction of rotation, the stop can be activated and deactivated. In particular, a control, such as a switching of a stop, can be performed by the axial displacement of the spindle, wherein this can be activated by displacement of the spindle in one direction and deactivated in the other direction. In an especially advantageous way, the activation and deactivation can be performed by means of a momentary movement of the spindle in a single direction, for example, corresponding to a control of a writing tip of a retractable push-button pen by means of a single press of a button alternately extending and retracting the writing tip.

It can also be advantageous to provide a stop mechanically bypassing the ball screw in addition to the lower adjustment position between the components. For example, a continuous setting of an adjustment position can be eliminated by providing stops only at an upper and lower adjustment position.

For setting the at least one switchable stop, a switching device is provided. In one advantageous embodiment, the switching device is formed from a rotating cam ring held on the spindle in a fixed axial manner with cams engaging between the adjustment positions in the longitudinal grooves. Furthermore, a control ring connected rigidly to the second component is provided with ramps arranged rising over the circumference. When the cams run up against the ramps in a switching area between the upper adjustment position and a switching position of the spindle setting the rotational position of the cams or the cam ring, the switchable stop is switched accordingly to the switching principle of a retractable click pen. For this purpose, the cams of the cam ring are guided between the two adjustment positions into the longitudinal grooves and are moved out of these grooves between the upper adjustment position and the switching position or are displaced out of these grooves through corresponding displacement of the spindle. Consequently, the cam ring can be rotated relative to the spindle and comes into active engagement with the ramps of the control ring by means of its cams for further displacement of the spindle in the direction of the switching position. The ramps of the control ring arranged fixed relative to the second component rising in the circumferential direction rotate the cam ring in the way that the cams are oriented in the circumferential direction with the longitudinal grooves or with recesses aligned in a first rotational position. The recesses are allocated fixed to the second component and form the switchable stop with the cams. Depending on the number of actuation movements of the spindle against the control ring, the cams are set alternately aligned with the longitudinal grooves or aligned with the recesses. For a return movement of the spindle after a reversal of the rotational direction of the electric motor, the previously oriented cams are displaced into the longitudinal grooves or into the recesses forming the switchable stop. Cams displaced into the recesses are rotated after the formation of the stop through new displacement of the spindle to the switching position back into the rotational position aligned with the longitudinal grooves, so that after a new reversal of the rotational direction of the electric motor, the lower adjustment position can be approached. Preferably, each of the cams has a ramp that is turned away from the recesses and longitudinal grooves and is complementary to the ramps of the control ring. The width of the ramps in the circumferential direction on the control ring is set so that, for a rotation of the cams along first ramps of the control ring, the next ramps in the circumferential direction each form a stop at a circumferential position of the longitudinal grooves or recesses form a stop in the circumferential direction for the cams.

In addition, for the low-friction introduction and changing of the rotational positions to the next ramps of the cams in the longitudinal grooves or recesses, the recesses and longitudinal grooves have insertion bevels that are complementary to an insertion profile of the cams.

The second component can be a known sleeve part of the suspension strut with mounting plates for mounting a wheel carrier. In the sleeve part, another sleeve part that contains the longitudinal grooves and recesses and is connected rigidly to the second component like the sleeve part is, for example, pushed into this part and connected to this part in a rotationally fixed way. In addition, the control part is held rigidly in the second component.

At the lower adjustment position, another axial stop can be provided that mechanically bypasses the ball screw in this adjustment position. For this purpose, the anti-rotation lock or a different component connected to the spindle can form a stop with the second component, for example, for a second component constructed as a sleeve part with a base or cover part attached to the sleeve part. For example, the anti-rotation lock can have a stop ring that is mounted rigidly on the end side of the spindle and forms the axial stop of the lower adjustment position with a base part of the first component.

In the lower adjustment position, the flow of forces runs from the wheel via the wheel carrier into the second component like the sleeve part. The spindle forms, with the base part of the sleeve part, a stop, so that impact forces are transmitted into the spindle while bypassing the ball screw and from the spindle into the first component via the biased spring into a spring plate connected to the vehicle body and then to the vehicle body.

In the upper adjustment position, for a switched stop, the flow of forces runs from the wheel via the wheel carrier into the second component like the sleeve part, from there via the recesses and the cams while bypassing the ball screw into the spindle and from there via the biased spring into the vehicle body. In both adjustment positions, the balls and raceways of the ball screw are protected from shock loads and other dangerous force influences of the wheel. The ball screw with the present switchable axial stop in the upper adjustment position and optionally an axial stop in the lower adjustment position can be arranged in the device between two longitudinally displaceable components. For example, the longitudinally displaceable components could be provided in a suspension strut between the wheel mount and a first spring plate of a shock absorber such as, for example, a McPherson strut, between an upper spring plate and a mount on the vehicle body or between two spring plates.

BRIEF DESCRIPTION OF THE DRAWINGS

The invention will be explained in more detail with reference to an embodiment shown in FIGS. 1 to 11. Shown herein are.

DETAILED DESCRIPTION OF THE PREFERRED EMBODIMENTS

Figure 1:
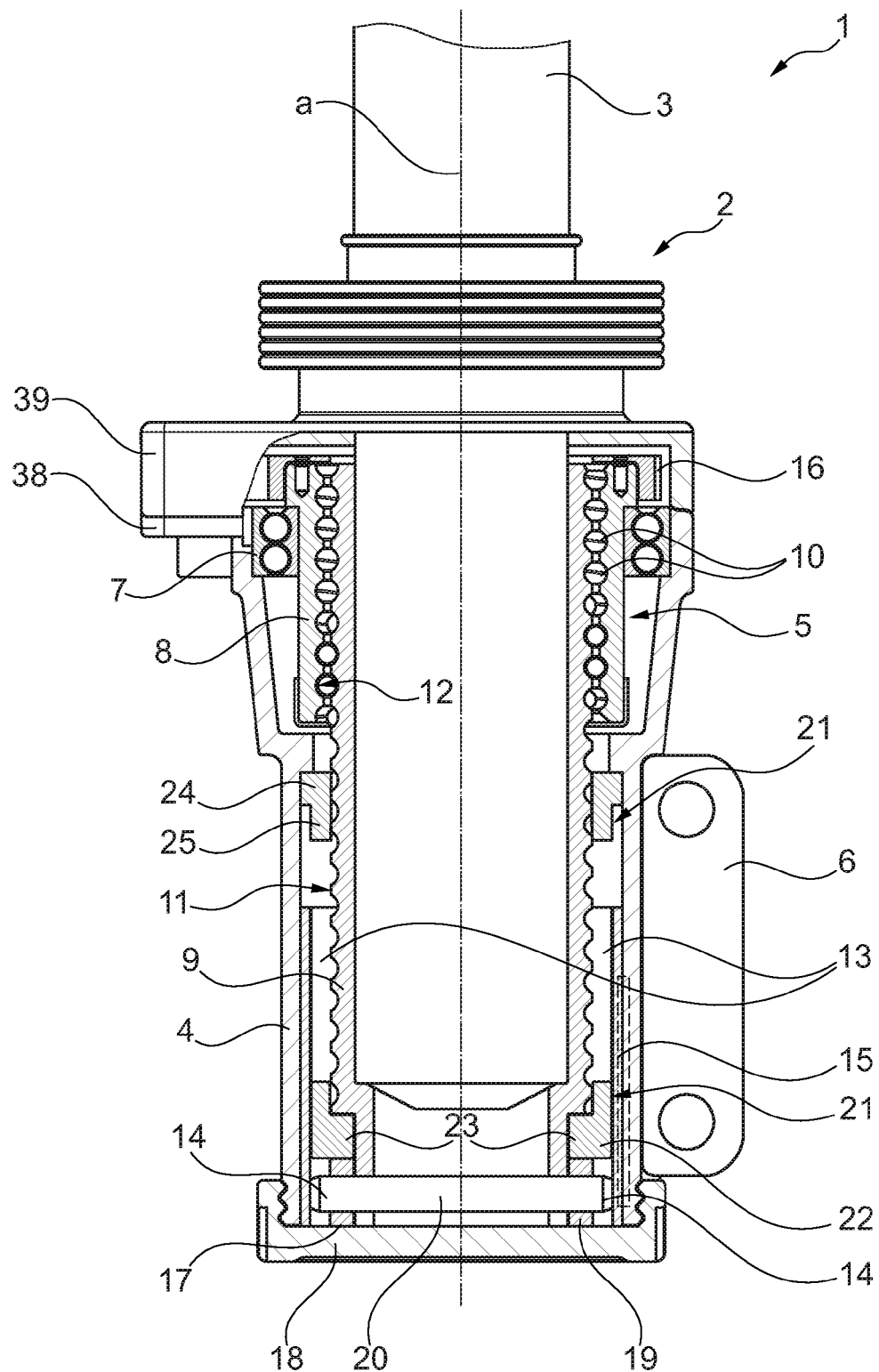
FIG. 1 a section through a device for adjusting the height of a vehicle body.

FIG. 1 shows the device 1 for adjusting the height of a vehicle body with the suspension strut 2 with the longitudinally displaceable first and second components 3, 4. The second component 4 in the form of a sleeve part holds the ball screw 5 that performs the adjustment of the second component 4 relative to the first component 3. The first component 3 contains a not-shown spring plate for clamping against a spring plate allocated to the vehicle body. The second component 4 has mounting plates 6 that are used for attaching a wheel carrier holding a wheel.

The ball screw 5 contains the rotating spindle nut 8 that is held in an axially fixed manner in the housing 38 with the cover 39 of the second component 4 by means of the rolling bearing 7 and is held on the spindle 9 arranged about the spindle axis a by means of the balls 10 forming a rolling connection between the thread-shaped raceways 11, 12 of the spindle nut 8 and spindle 9. The spindle 9 is held locked in rotation and axially displaceable by means of the bolt 14 engaging in the longitudinal grooves 13 and arranged fixed on the end side of the spindle facing away from the spindle nut 8 relative to the second component 4. The longitudinal grooves 13 are formed in the sleeve part 15 formed integrally here with the housing 38.

The spindle nut 8 is rotationally driven by means of the belt 16 by a not-shown electric motor that is accommodated in or connected to, for example, the housing 38. The electric motor controlled by a control unit controls the axial displacement of the spindle 9 connected to the first component 3 relative to the spindle nut 8 through the rotational drive of the spindle nut 8 and thus the axial displacement such as the longitudinal displacement of the first component 3 relative to the second component between two adjustment positions with a lower adjustment position for minimum displacement of the two components 3, 4 and an upper adjustment position for maximum displacement of the components 3, 4 set during the operation of the vehicle along their longitudinal axis like the spindle axis a of the spindle 9.

The device 1 has a stop at each of the two adjustment positions for bypassing the ball screw 5 or its balls 10 and raceways 11, 12. In the illustrated embodiment, the spindle 9 is at the lower adjustment position at which the stop 17 is formed between the spindle 9 and the base part 18 of the second component 4. For this purpose, the stop ring 19 is held fixed on the spindle, through which the pin 20 is guided with the two bolts 14 engaging in the longitudinal grooves 13.

The flow of forces is realized in the lower adjustment position from the wheel, the wheel carrier via the mounting plates 6, to the second component 4. Via the base part 18, the stop ring 19, and the bolt 14, forces and shocks acting from the wheel are transmitted directly into the spindle 9 and thus to the first component 3, so that the balls 10 and raceways 11, 12 are bypassed mechanically. The support of the wheel on the vehicle body takes place in the reverse sequence.

The stop at the upper adjustment position is switchable. For this purpose, the switching device 21 is provided that is formed from the cam ring 22 that is held on the spindle 9 in an axially fixed and rotating manner with the cams 23 and the control ring 24 held fixed on the second component 4 with the rising ramps 25 distributed around the circumference. For activating the switchable stop, the spindle 9 is displaced from the position going into the second component 4 beyond the upper adjustment position, so that the cam ring 22 located in a first rotational position is arranged axially above the longitudinal grooves 13 and the cams 23 move out from the longitudinal grooves 13. When approaching the switching position, the cams 23 come into contact with the ramps 25 and are rotated for a further displaced spindle 9 up to the stop on the next ramp into a second rotational position. In this rotational position, the cams 23 align axially with recesses that are not visible here and are formed in the sleeve part and alternate with the longitudinal grooves 13 in the circumferential direction, on which the cams 23 are supported axially for a return displacement of the spindle 9 and thus form the switchable stop. During the displacement of the cams 23 in the longitudinal grooves 13, these are rotated, for example, onto insertion bevels 31 in the area of the recesses 30 (FIG. 9) into another rotational position, so that they run back onto the next ramps 25 for the return displacement.

It is understood that, in the sense of kinematic reversal, the control ring 24 with the ramps 25 can also be arranged at the lower adjustment position for minimum displacement of the components relative to each other. Here, the spindle can be compared with the spindle 9 of the shown design rotated along the spindle axis by 180°, so that the cam ring that can rotate on the spindle is arranged above the control ring with the switching ramps.

The bolts 14 remain in the longitudinal grooves 13 during the complete displacement of the spindle 9 and thus guarantee a continuous rotationally locked mounting of the spindle 9 relative to the sleeve part 15 and thus relative to the second component 4. For a return displacement of the spindle 9 in the direction of the switching position, the cam ring 22 is rotated again onto the ramps 25 of the control ring 24, so that the cams 23 are arranged aligned with the longitudinal grooves 13, so that the spindle 9 can be displaced with the cams 23 moving into the longitudinal grooves 13 back in the direction of the base part 18 at the shown lower adjustment position.

Figures 2, 3:
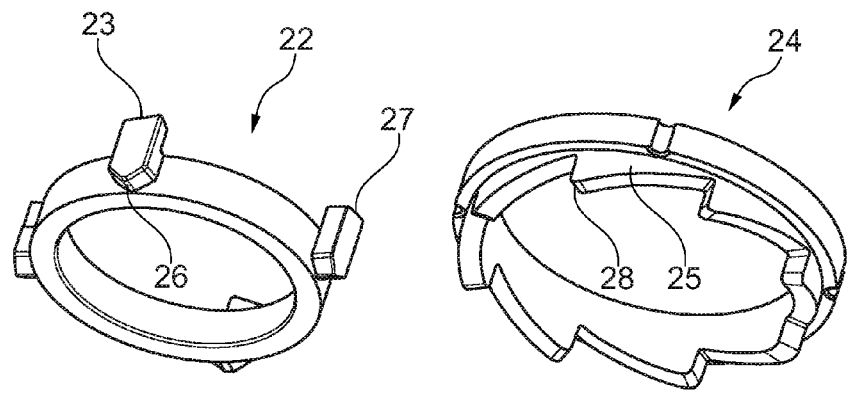
FIG. 2 a cam ring of FIG. 1 in a 3-D view.
FIG. 3 a control part of FIG. 1 in a 3-D view.

FIG. 2 shows, with reference to FIG. 1, the cam ring 22 with the cams 23 displaceable in the longitudinal grooves 13. The cams 23 have, facing the longitudinal grooves 13, the insertion profiles 26 for easier insertion into the longitudinal grooves 13 provided accordingly with complementary insertion bevels. In addition, ramps 27 facing the control ring 24 are provided that are formed complementary to the ramps 25 of the control ring 24.

FIG. 3 shows, with reference to FIGS. 1 and 2, the control ring 24 with the ramps 25 distributed around the circumference and rising in the circumferential direction. On the stops 28 of the ramps 25, after a rotation of the cam ring 22 by means of the ramps 25, 27 coming into active connection for an axial displacement of the spindle 9 in the direction of the switching position, the cams 23 are positioned aligned with the longitudinal grooves 13 or the recesses after approaching the switching position.

Figures 4, 5:
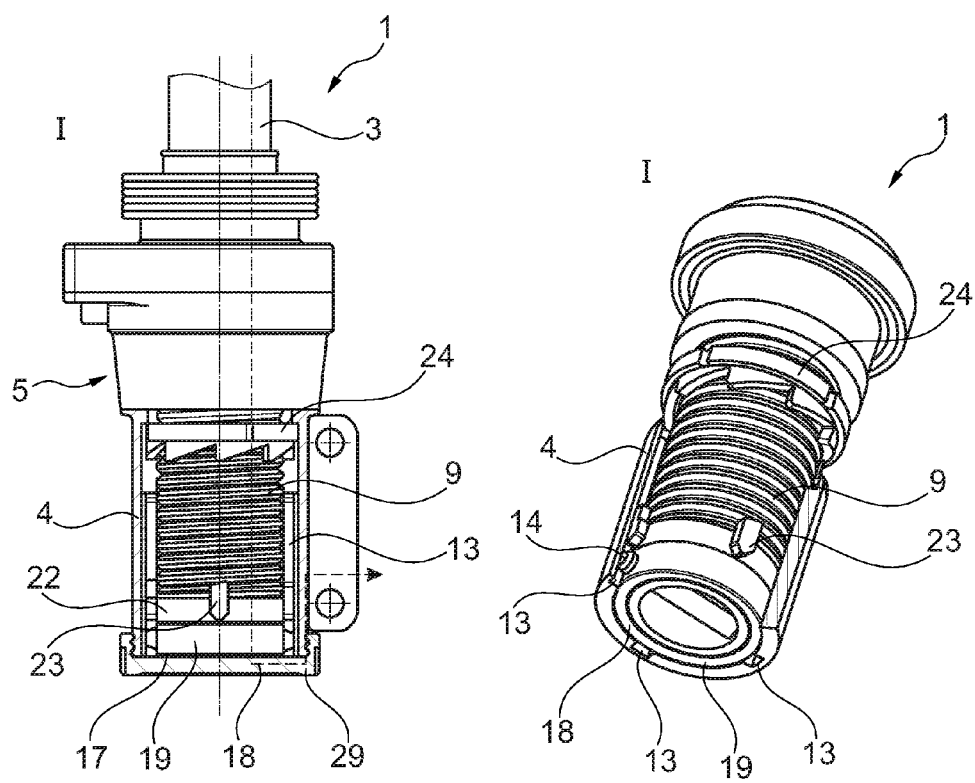
FIG. 4 the device of FIG. 1 at the lower adjustment position in a partially sectioned side view, FIG. 5 the device of FIG. 1 at the lower adjustment position in a sectioned 3-D view, FIG. 6 the device of FIG. 1 at the switching position in a partially sectioned side view, FIG. 7 the device of FIG. 1 at the switching position in a sectioned 3-D view, FIG. 8 the device of FIG. 1 at the upper adjustment position in a partially sectioned side view, FIG. 9 the device of FIG. 1 at the upper adjustment position in a sectioned 3-D view, FIG. 10 an expanded 3-D view of the device of FIG. 1, and FIG. 11 a device with positioning of the ball screw changed relative to the device of the previous figures.

FIGS. 4 and 5 show the device 1 of FIG. 1 in a partially sectioned side or 3-D view in the lower adjustment position I for a spindle 9 displaced at the stop 17 of the base part 18 with minimum axial displacement of the two components 3, 4. From FIG. 4 and FIG. 5 with removed base part 18 and omitted first component 3, the arrangement of the longitudinal grooves 13, the stop ring 19, the pin held in the spindle 9 with the bolts 14 engaging in the longitudinal grooves 13, the cam ring 22 mounted rotating and axially fixed on the spindle 9 adjacent to the stop ring 19 with the cams 23, and the control ring 24 mounted fixed in the second component can be seen in detail. The flow of force shown in FIG. 4 along the dashed arrow 29 for supporting the wheel on the vehicle body extends in the illustrated section from the first component 3 via the spindle 9, the stop ring 19, and the base part 18 directly bypassing the ball screw 5 into the second component 4.

Figure 6:
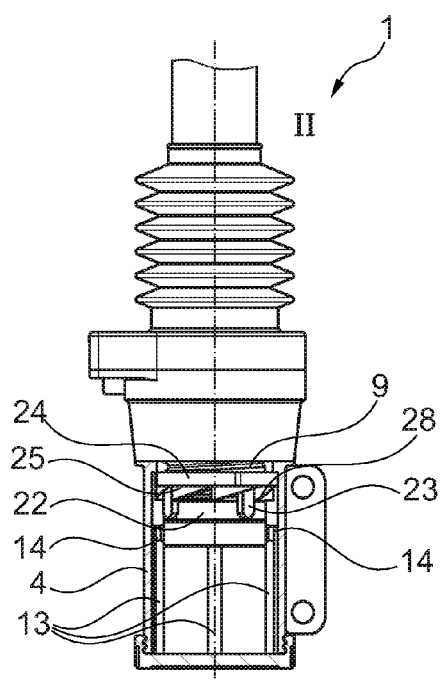
Figure 7:
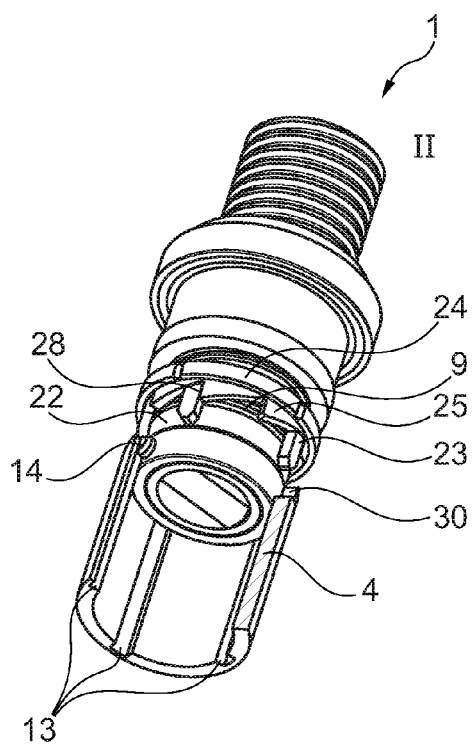

FIGS. 6 and 7 show the device 1 in the switching position II for maximum retracted spindle 9. In the switching position II, the cams 23 of the cam ring 22 come into contact with the ramps 25 of the control ring 24 and are rotated in the illustrated representation aligned with the recesses 30 formed in the second component 4 at the stops 28 of the ramps 25 of the control ring 24. While the cams 23 are moved out from the longitudinal grooves 13 and thus can rotate relative to the spindle at the switching position II, the bolts 14 remain in the longitudinal grooves 13 and further provide for a rotationally fixed arrangement of the spindle 9 relative to the second component 4.

Figure 8:
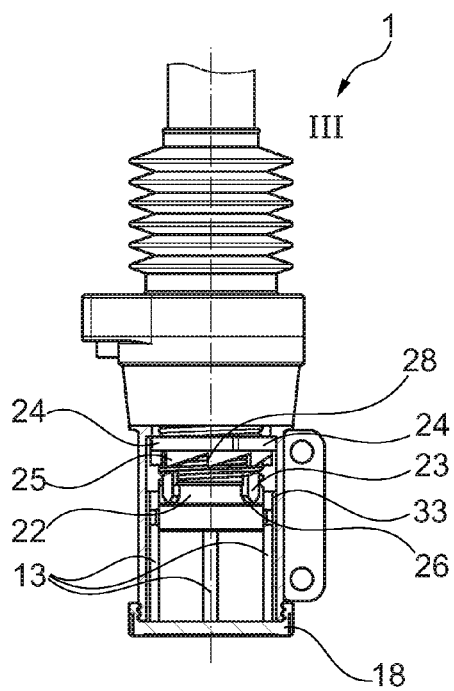
Figure 9:
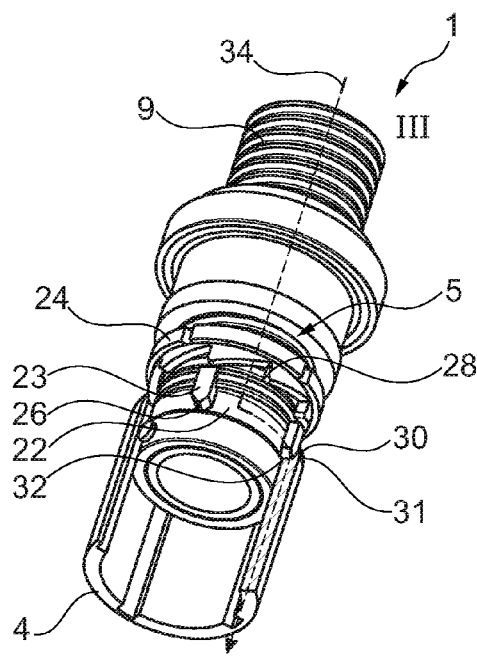

FIGS. 8 and 9 show the device 1 in the upper adjustment position III. After reaching the switching position II of FIGS. 6 and 7, the spindle 9 is retracted in the direction of the base part 18. In this way, the cams 23 thread by means of the insertion profiles 26 into the recesses 30 slightly displaced in the circumferential direction with the insertion bevels 31, so that, under slight rotation of the cam ring 22, the switchable stop 32 is formed between the cams 23 and recesses 30. Through the slight rotation of the cam ring 22 by means of the interplay between the insertion profile 26 and insertion bevels 31, the cams 23 are again opposite the rising ramps 25 of the control ring 24, such that for the next displacement of the spindle 9 in the direction of the ramps 25, these rotate the cam ring 22 and thus the cams 23, so that these again align with the longitudinal grooves 13. Also on the longitudinal grooves 13, corresponding insertion bevels 33 are provided that slightly rotate the cam ring 22 for threading of the cams 23, so that for each approach of the switching position II of FIGS. 6, 7, the cams 23 can be rotated from the ramps 25 to the stops 28.

The flow of force shown in FIG. 9 along the dashed arrow 34 for supporting the wheel on the vehicle body extends in the illustrated section from the first component via the spindle 9 and by means of the switchable stop 32 via the cam ring 22, the cams 23, and the recesses 30 directly bypassing the ball screw 5 into the second component 4. It is understood that several longitudinal grooves 13 distributed around the circumference with recesses 30 arranged at different adjustment positions, so that a multi-step switching of axial stops can be provided.

Figure 10:
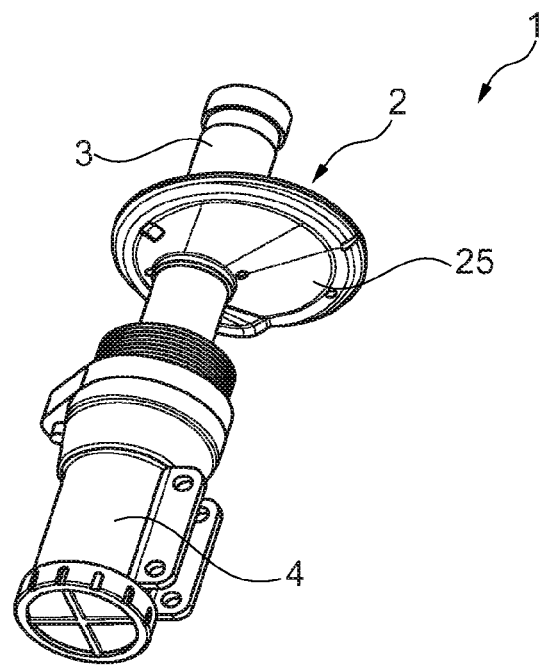

FIG. 10 shows the device 1 in expanded 3-D view with the first component 3 and the second component 4 as well as spring plate 35 arranged on the first component for holding a spring of the suspension strut 2.

Figure 11:
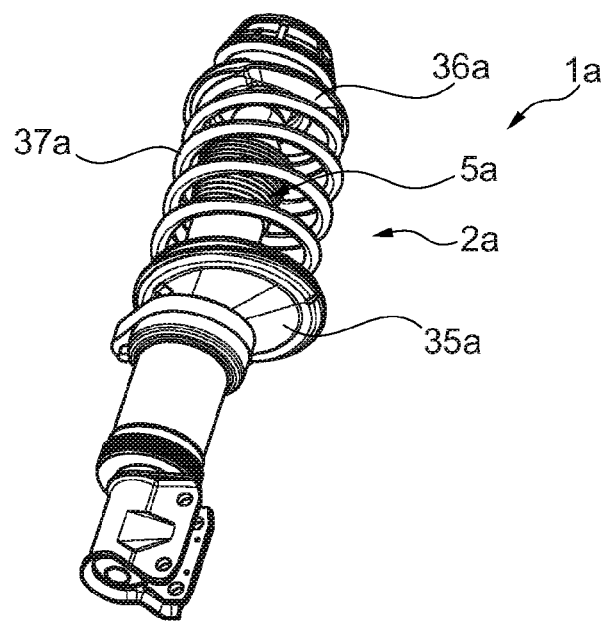

FIG. 11 shows the device 1a in the form of the suspension strut 2a that has the spring 37a as a McPherson strut with spring plate 36a between the lower spring plate 35a and the upper spring plate 36a. In contrast to the device 1 shown in the preceding figures, the ball screw 5a is arranged with its axial stops between the components 3a, 4a carrying the spring plates 35a, 36a.

LIST OF REFERENCE NUMBERS

1 Device
1a Device
2 Suspension strut
2a Suspension strut
3 First component
3a First component
4 Second component
4a Second component
5 Ball screw
5a Ball screw
6 Mounting plate
7 Rolling bearing
8 Spindle nut
9 Spindle
10 Ball
11 Raceway
12 Raceway
13 Longitudinal groove
14 Bolt
15 Sleeve part
16 Belt
17 Stop
18 Base part
19 Stop ring
20 Pin
21 Switching device
22 Cam ring
23 Cam
24 Control ring
25 Ramp
26 Insertion profile
27 Ramp
28 Stop
29 Arrow
30 Recess
31 Insertion bevel
32 Switchable stop
33 Insertion bevel
34 Arrow
35 Spring plate
35a Spring plate
36a Spring plate
37a Spring
38 Housing
39 Cover
a Spindle axis
I Lower adjustment position
II Switching position
III Upper adjustment position

The invention claimed is:

1. A device for adjusting a height of a vehicle body comprising first and second components that are displaceable longitudinally between adjustment positions (I, II, III) relative to each other and with a ball screw that sets the adjustment positions (I, II, III) and has a spindle and a spindle nut, the spindle is connected to one component in an axially fixed manner and the spindle nut is connected to the other component in an axially fixed manner, at least one switchable axial stop operatively arranged between the two components mechanically bypasses the ball screw in at least one of the adjustment positions (I, III), wherein the at least one switchable stop comprises a switching device with a cam ring that is supported for rotation about a spindle axis (a) of the spindle and is supported on the spindle in an axially fixed manner, and the cam ring includes cams arranged distributed around a circumference around the spindle axis (a).

2. The device according to claim 1, the second component supported on the spindle nut in an axially fixed manner is provided with longitudinal grooves arranged along the spindle axis (a) and arranged distributed around a circumference around the spindle axis (a) and with recesses, the cams of the cam ring engage in a first rotational position of the cam ring relative to the second component in the longitudinal grooves, and, in at least one of the adjustment positions (III), the cams engage in another rotational position of the cam ring in the recesses and form a first axial, switchable stop.

3. The device according to claim 2, wherein the switching device further comprises a control ring that is connected rigidly to the second component and is arranged around the spindle axis (a) and is provided with ramps arranged distributed around the circumference, the cam ring rotates under its axial displacement relative to the control ring about the spindle axis (a) so far that the cams of the cam ring are displaced along the ramps, and the cam ring is rotated from a first rotational position in a direction of the other rotational position by said rotation about the spindle axis (a).

4. The device according to claim 3, wherein the cam ring is displaced axially relative to the second component under actuation of the ball screw, the cam ring is displaced axially relative to the second component without relative rotation during engagement of the cams in the longitudinal grooves of the second component and the cam ring is rotated with the cams outside of said engagement for contact on the ramps of the control ring.

5. The device according to claim 2, further comprising another stop that mechanically bypasses the ball screw provided between the components at a lower adjustment position (I) for minimally displaced components.

6. The device according to claim 5, wherein the recesses and the longitudinal grooves have insertion bevels that are complementary to an insertion profile of the cams and displace the cams slightly in the circumferential direction during a mounting process.

7. The device according to claim 6, wherein the longitudinal grooves and the recesses are provided in a sleeve part connected rigidly to the second component.

8. The device according to claim 7, wherein the other stop is formed between the spindle and a base part of the sleeve part.

9. The device according to claim 2, wherein the spindle is rotationally locked relative to the second component by a bolt engaging in the longitudinal grooves.

10. The device according to claim 1, wherein the spindle nut is held so that it rotates in a housing connected to the second component, and the housing holds a rotary drive for the spindle nut.

* * * * *